United States Patent
Watanabe

(10) Patent No.: US 7,461,176 B2
(45) Date of Patent: Dec. 2, 2008

(54) METHOD FOR INITIALIZATION OF STORAGE SYSTEMS

(75) Inventor: Naoki Watanabe, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 576 days.

(21) Appl. No.: 10/429,059

(22) Filed: May 2, 2003

(65) Prior Publication Data

US 2004/0221102 A1    Nov. 4, 2004

(51) Int. Cl.
*G06F 3/00* (2006.01)
*G06F 9/00* (2006.01)

(52) U.S. Cl. .............................. 710/5; 713/1
(58) Field of Classification Search ................ 710/5; 713/1
See application file for complete search history.

(56) References Cited

U.S. PATENT DOCUMENTS

| | | | |
|---|---|---|---|
| 4,814,904 A | | 3/1989 | Shigihara et al. |
| 4,939,598 A | | 7/1990 | Kulakowski et al. |
| 5,450,384 A | | 9/1995 | Dahman et al. |
| 5,689,729 A | | 11/1997 | Inoue |
| 5,835,939 A | | 11/1998 | Kurokawa et al. |
| 5,943,689 A | * | 8/1999 | Tamer ........................ 711/166 |
| 6,009,058 A | | 12/1999 | Sims, III et al. |
| 6,243,221 B1 | * | 6/2001 | Ito ................................ 360/31 |
| 6,385,681 B1 | | 5/2002 | Fujimoto et al. |
| 6,453,383 B1 | * | 9/2002 | Stoddard et al. ............. 711/112 |
| 6,467,023 B1 | | 10/2002 | DeKoning et al. |
| 6,473,380 B1 | | 10/2002 | Takahashi |
| 6,606,285 B1 | * | 8/2003 | Ijtsma et al. ................. 369/47.1 |
| 6,813,687 B1 | * | 11/2004 | Humlicek .................... 711/114 |
| 6,996,666 B2 | * | 2/2006 | Sasaki ......................... 711/112 |
| 7,174,476 B2 | * | 2/2007 | Ashmore et al. ............... 714/5 |
| 2002/0136137 A1 | | 9/2002 | Shishido et al. |
| 2002/0144070 A1 | * | 10/2002 | Watanabe et al. ........... 711/165 |
| 2002/0159353 A1 | * | 10/2002 | Sasaki ...................... 369/53.15 |
| 2003/0018864 A1 | * | 1/2003 | Ikeuchi et al. ............... 711/161 |
| 2003/0033475 A1 | * | 2/2003 | Sasaki ......................... 711/112 |
| 2003/0048731 A1 | * | 3/2003 | Ozaki ....................... 369/59.25 |
| 2004/0117723 A1 | * | 6/2004 | Foss ........................... 714/805 |
| 2004/0243762 A1 | * | 12/2004 | Brant et al. .................. 711/114 |

* cited by examiner

*Primary Examiner*—Alford Kindred
*Assistant Examiner*—Richard Franklin
(74) *Attorney, Agent, or Firm*—Townsend and Townsend and Crew LLP

(57) ABSTRACT

A method and apparatus are described for providing initialization in large storage systems as a background function, upon demand, and upon receipt of write requests. The initialization may be carried out under control of the hard disk drive itself, a storage controller, or both systems. The initialization is performed transparently to the host computer making operation of the storage system immediately after it is coupled to the host feasible.

7 Claims, 18 Drawing Sheets

METHOD FOR INITIALIZATION OF STORAGE SYSTEMS

BACKGROUND OF THE INVENTION

This invention relates to storage systems, and in particular a method and apparatus for preparing storage systems for initial use.

Modern storage systems are capable of storing thousands of gigabytes of data using large numbers of hard disk drives or other storage media. When the system is first used, however, it is necessary that the system be physically initialized by having each of the hard disk drives or other media suitably prepared for use. This operation is often referred to as "formatting" the storage media. Initializing or formatting positions various markers on the hard disk drives to designate where information is to be stored. It usually also is used to write desired "null" data onto the disk to assure that all of the bits are in a defined state. The null data may consist of a pattern of 0's, or 1's, or some mixture of the two. Sometimes this initialization process is also done after the system has been in operation for a period of time, for example to reset the system or to remove information from the disks that is no longer wanted, etc. Initializing large storage systems can require many hours, precluding their use by the user or the system within which they are installed, until all of the hard disk drives are initialized. This is undesirable.

Some initialization techniques do not rewrite all of the data regions on the disk, instead clearing only the directory information—in effect removing data from the disk by removing an entry in the index to allow that location to be later reused. Such procedures have become known as "quick" initialization or formatting. These procedures require that the disk have been initialized at some prior time. In addition, quick initialization has a disadvantage of leaving data on the disk. Thus, a "read operation" to a portion of the disk in which only the directory was initialized, may result in the return of incorrect data.

U.S. Pat. No. 6,467,023 describes a method for creating logical units in a RAID storage system and making those units immediately available. Although its purpose is similar to that described herein, it does not describe operations for unformatted areas of the disk. It also does not teach initializing as a background operation. A background copy may be implemented using details of the "Flash Copy" capability described in the IBM RedBook "Implementing ESS Copy Services on S/390" at section 4.8.

BRIEF SUMMARY OF THE INVENTION

Broadly speaking, this invention provides a technique by which the initialization operation for a storage system is performed in a manner which allows the storage system to be installed and used immediately, appearing to the user that the system has previously been initialized. One approach to achieving this is for the initialization to be performed as a interruptible background job, either automatically or upon receipt of special commands. In implementing either approach, the storage system includes a pointer and a bit map. The pointer is used to point to a next area of the disk drive that has not yet been initialized, while the bit map is used to store a map of the initialization status of all regions of the drive, indicating whether each has been initialized. Any data targeted at such non-initialized regions is stored in a cache until the targeted region is ready to receive that data. Once the targeted region is ready to receive that data, then the data is written to the media. In the meantime, the system has been able to proceed with the next requested operation.

In implementing the techniques described herein, special procedures are used for read and write operations, and for initialization. In a read operation, the requested address is first checked to determine whether it falls within an area of the disk drive (or other media) which has previously been initialized. If the area has been initialized and updated, i.e. data has been written to that block, then data is returned from the disk in a conventional manner. If the requested address has not yet been initialized, then the cache memory is checked. If the bit map indicates that the particular block of data sought has been updated, then the data is returned from that block. On the other hand, if the bit map indicates that the block of data has not yet been updated, then null data is returned.

The write operations are carried out in a similar manner to the read operations. When a write is to occur, the system first checks the requested address to see if it is available, i.e. has been initialized. If the area for the write has already been initialized, then the data is written onto the disk in a conventional manner. On the other hand, if the data location has not yet been initialized, then the data is written to a cache for storage until that region of the disk is initialized. After initialization, then the data is written from the cache onto the disk.

Thus, generally speaking, whenever an operation is carried out on the disk, if the block where that operation is to be carried out has already been initialized, then the initialization step is skipped. If it has not already been initialized, then the initialization step is performed prior to writing the data to the disk. These approaches result in the storage system being available for use essentially immediately after being connected. Thus, in one embodiment a method for preparing storage media in a storage system for data to be written to the storage media includes a step of preparing the storage system incompletely before operation of the system begins.

In another embodiment, a method of reading data from a storage system which has not been completely initialized includes the steps of checking the address from which data is to be read, and if that address is located in an initialized area, providing the data. On the other hand, if that address is located in an area which has not been initialized, then other storage is checked and the data returned from that other storage, typically a cache memory.

The method of writing data to a storage system which has not been completely initialized includes steps of checking the address to which the data is to be written and, if the address is located in an initialized area, then writing the data. On the other hand, if the address is located in an un-initialized area of the storage system, then the data is maintained in the cache until that region is initialized. The storage system for implementing this approach includes media for storing data in response to commands from host units, the media requiring initialization before it can be used for the storage of data.

DETAILED DESCRIPTION OF THE INVENTION

Figure 1:
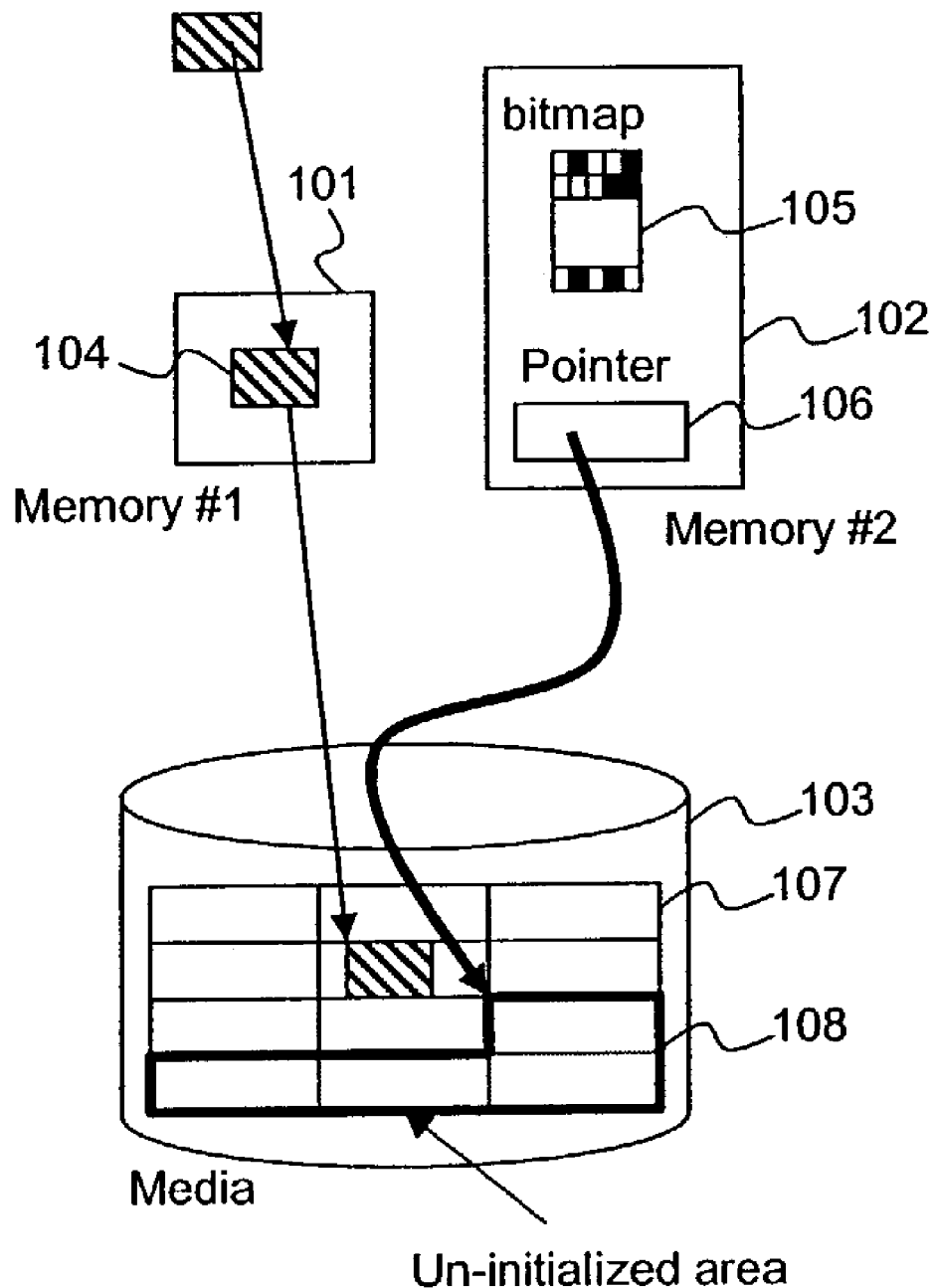
FIG. 1 illustrates a basic configuration for implementation of the invention.

FIG. 1 is a diagram illustrating a basic configuration of a portion of a storage system in which this invention may be implemented. FIG. 1 illustrates two memories 101, 102 and storage media 103 for storing data. Typically storage media 103 is a hard disk drive. The memories are usually semiconductor memories, for example DRAM, SRAM, flash, etc. Memory 101 provides a work area 104 used to handle (or buffer) read and write requests. Work area 104 is often referred to as a cache memory. Memory 102 maintains a bit map 105 and a pointer 106. The bit map 105 provides a representation of the initialization status of the media, while the pointer 106 points to an initial portion of the media awaiting initialization.

Generally, in the operation of media such as hard disk drive 103, it is necessary for the media to be initialized before it can store data. The initialization step often places sector, track or other information on the media to provide an identifying location for storage of information, and usually checks the status of each storage location on the media to assure that it is functional. Initialization of the media in this manner is often termed "formatting." In the system depicted in FIG. 1, the media has been divided into a series of what are referred to herein as "chunks" 107 which are of arbitrary size. For example, each one of the chunks or storage regions within the storage area 107 can be a sector, a block, a 1 megabyte area, or some arbitrary amount of storage as defined by the storage system. Within memory 102, the bit map maintains a record of the initialization status of each chunk of the media. In a preferred embodiment, each bit within the bit map indicates whether that corresponding portion of the storage media has been initialized. Thus, an external apparatus, for example a storage controller, can check the bit map and readily determine the initialization status of each chunk 107 of media 103.

While in the illustrated embodiment memory 102 is shown as storing only a bit map and a pointer, in some implementations it will store additional information, for example, a particular pattern of initialization data to be written. Often, when media is formatted, a particular data pattern is written to the media to assure its proper functionality. For example, a pattern of alternating 1's and 0's might be written to the media. Pointer 106 points to the next portion 108 of the media to be initialized the initialization is carried out an ordinary sequential operation. (As will be explained below any arbitrary order may be employed.) The pointer 106 may also be used to indicate where a resume operation should begin if the initialization process is interrupted. This eliminates the need to reinitialize the entire disk if there is an external power failure or reset operation. In a preferred embodiment media 103 will be a volume which was defined by the storage controller in the storage system.

Figure 2:
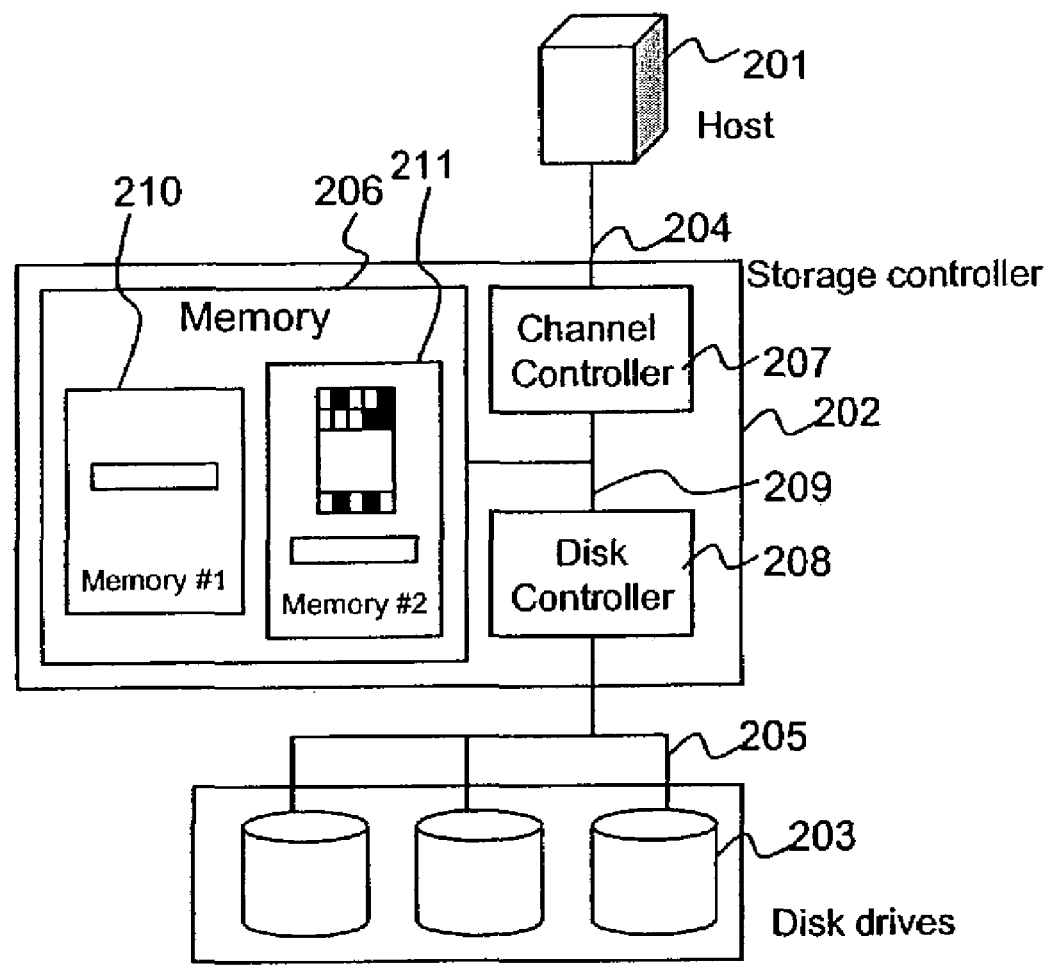
FIG. 2 is a block diagram illustrating the configuration in more detail.

FIG. 2 is a diagram illustrating a first system configuration. The system of FIG. 2 illustrates an overall storage system within which this invention may be situated. Shown in FIG. 2 is a host 201, a storage controller 202, and a series of disk drives 203. The disk drives are usually arranged as a RAID or similar type system. Generally the host will send commands to the storage controller to write data to, or read data from, the disk drives 203, to retrieve information at the request of some external computer (not shown). For example, the external computer may be a terminal at an airline reservations office and the disk drives may store the passenger and ticket information. Typically the host and storage controller communicate with each other over a channel 204, and there may be multiple storage controllers and multiple hosts, depending upon the particular system configuration. Channel 204 can be a Fibre channel, ESCON, SCSI, GE or other channel implementation. Host 201 and channel 204 are well known commercially available components.

Storage controller 202 itself includes a series of components such as memory 206, memory 211, channel controller 207, disk controller 208 and an internal bus system 209. The channel controller 207 and disk controller 208 regulate communications between the storage controller and the host and between the storage controller and the disk drives 203 over bus 205. An architecture for a storage controller such as depicted may be found in U.S. Pat. Nos. 6,689,729 and 6,385,681. Also see U.S. Pat. No. 6,236,528 which describes a method and apparatus for recording and reproducing using a dual head structure and U.S. Pat. No. 5,109,500 which describes a disk drive control unit.

The memory 206 within the storage controller 202 typically will comprise a non-volatile memory, for example, a flash memory. Alternatively DRAM or SRAM or other memory may be employed with battery backup systems or the like to assure that information is not lost in the case of power failure. The memory 206 includes a cache memory 210 for buffering read and write operations, and a separate memory 211 to provide the initialization status bit map and functionality described in conjunction with FIG. 1. These memories are connected via internal bus 209 to the controllers 207 and 208. Busses such as bus 209 are well known, and may be implemented as a bus or as a switch. The disk drives 203 can be configured as a redundant array, for example, RAID or in other configurations. The disk drives are connected via disk bus 205, which can also be a Fibre channel, a SCSI bus, or an ATA bus to provide interconnections. Generally, storage controller 202 will translate between the logical disk addresses which the host 201 employs and the physical disk addresses used in the disk drives 203.

Figure 3:
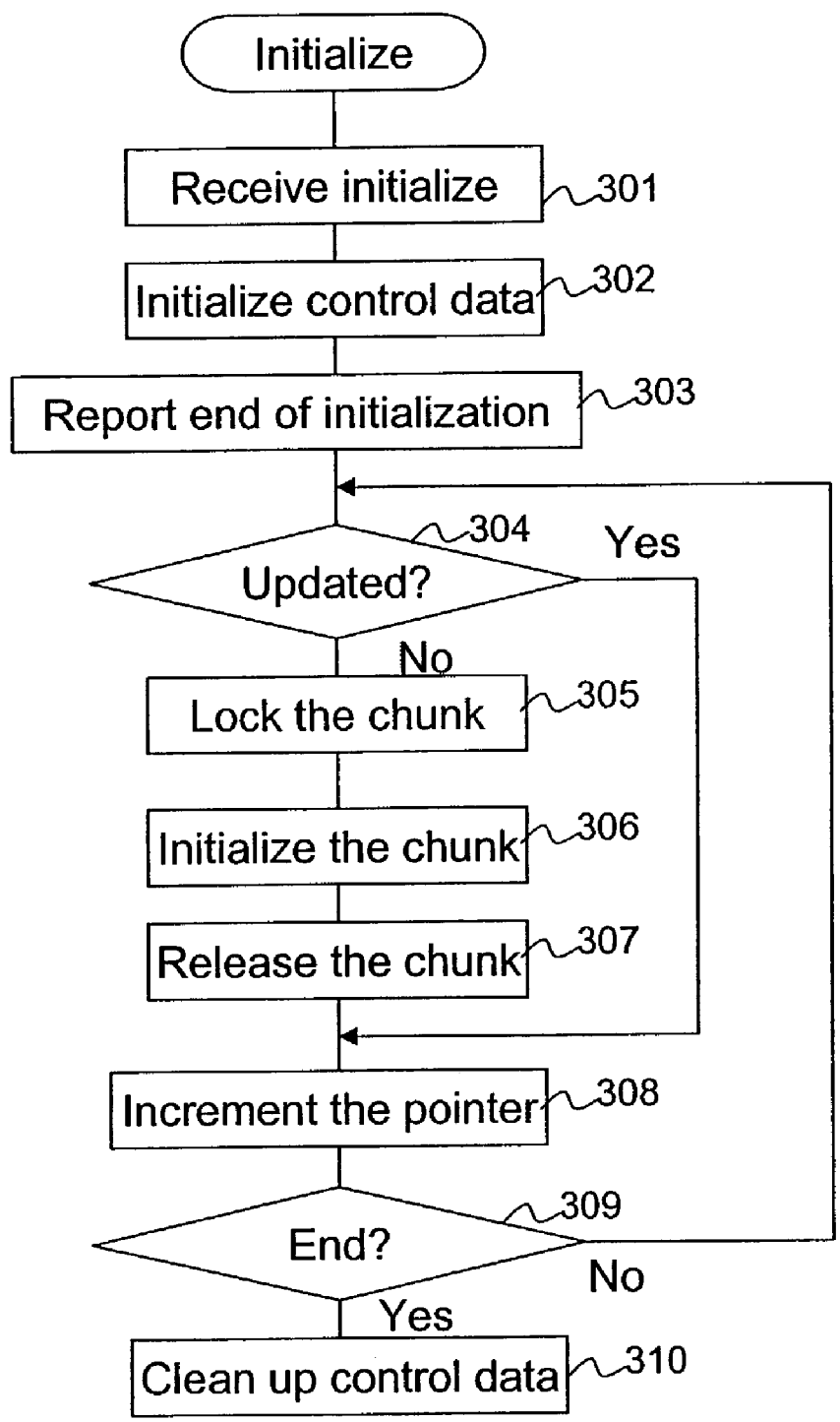
FIG. 3 is a flow chart illustrating the initialization process.

FIG. 3 is a flow chart illustrating a preferred initialization process of this invention employed with the storage system shown in FIG. 2 This process is implemented in situations in which the full array of disk drives 203 is not desired to be completely initialized before use of the system, i.e. situations wherein the disk drives are to be made available for use immediately. For example, the procedure may be employed when a new storage system, such as depicted in FIG. 2, is added to an existing operational larger system already in operation.

The initialization process in FIG. 3 begins with a step of receiving an initialization command at step 301. This command may be a manual command, for example, as triggered by the administrator of the system using a management console or a remote console, or it may be an inbound command generated by an external computer system. Examples of such external commands are the SCSI command "Format Unit" or the ATA command "CFA Erase Sectors." In response, the initialization process will typically write all 0's data to the storage, but other arbitrary data patterns also may be employed, depending upon the preferences of the administrator and/or the storage system design.

At step 302 the initialization process begins. The first step is to initialize the control data stored in memory 211. In this step all the bits in the bit map are set to indicate that none of the disk drives or chunks of disk drives reflected by that bit map have been initialized. At step 303 a report is generated that the initialization request has been received and acted upon. Upon receipt of this report, the storage controller and the host know that this volume or storage subsystem can receive and process requests made to it. For example, reads and writes to the disk may begin. Of course, the initialization operation itself has not been completed, however, from the point of view of the overall system employing this invention, the disk(s) is now in an operational condition. Of course, in systems not employing the invention described herein, the notification of completion of initialization would not occur until after the process actually has been completed.

Steps 304 to 309 shown in FIG. 3 describe the main procedure for initialization of the disk(s). At step 304 the storage controller 202 checks the bit map for the chunk which is to be initialized. If the appropriate bit in the bit map has been set, it means that this chunk has already does not need to be initialized. If that is the case, as shown by the "yes" line from block 304, the storage controller skips initialization of the chunk and increments the pointer 308 to point to the next chunk, at which the initialization may continue. On the other hand, if at step 304 the chunk has been determined not to have been initialized, the process flow moves to step 305 where the chunk is locked. Locking the chunk prevents it from being used by other processes. Data would be lost if the chunk is initialized after being partially written or read.

At step 306 the chunk is initialized, for example having the desired data pattern written to it. Next, at step 307 that chunk is unlocked or released and available for use. After the pointer is incremented at step 308, a test is made at step 309 as to whether all of the desired area has been initialized. If it has not, the flow returns back to the updated step 304 for the next chunk. On the other hand, if all of the desired area has been initialized, then the control data in memory 211 is appropriately revised and the process concluded. By performing the initialization in the manner depicted in FIG. 3, the initialization process may be done during low load time periods. For example, initialization may be performed only during late night hours, and suspended during the day.

Figure 4:
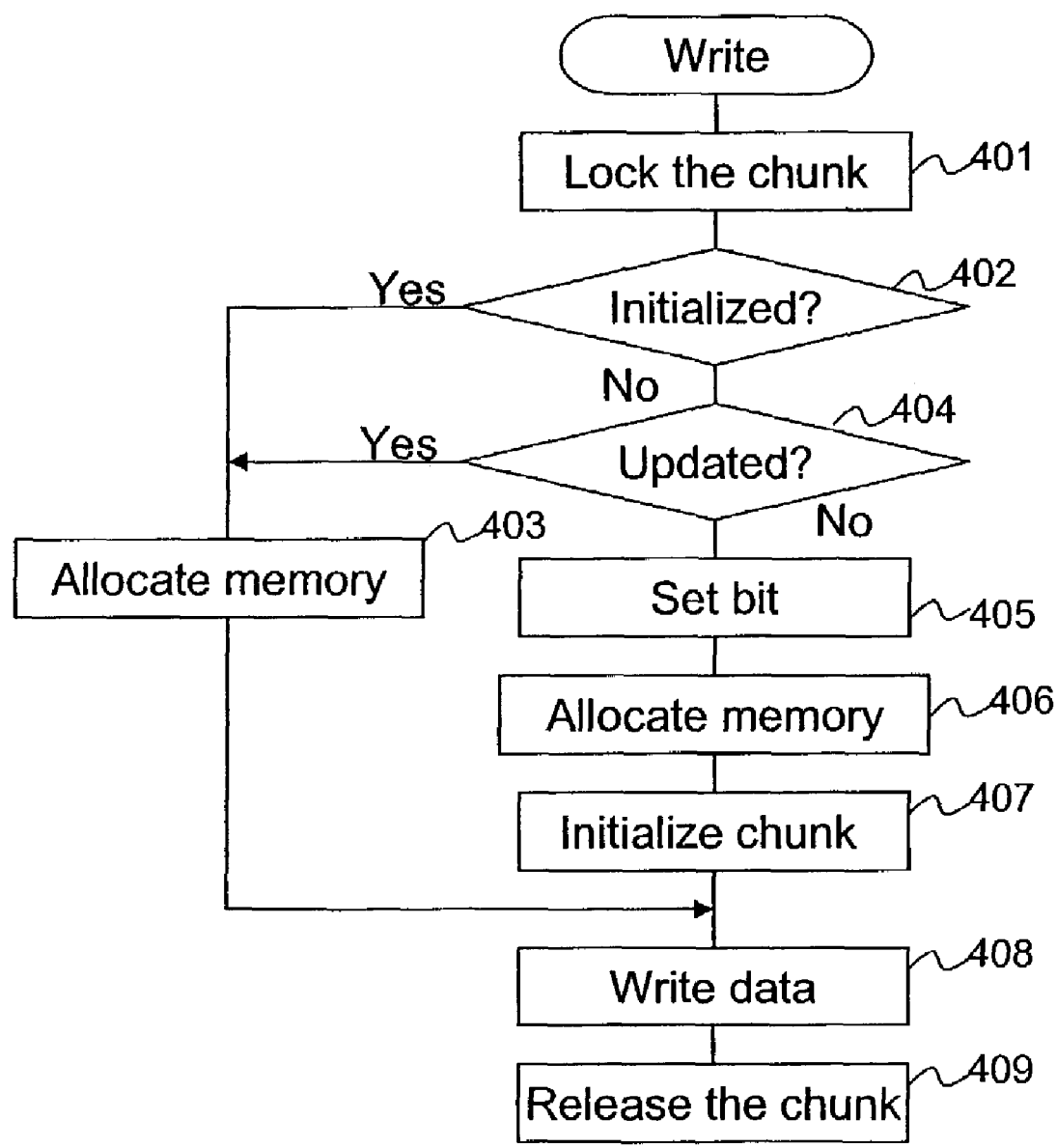
FIG. 4 is a flow chart illustrating a write operation.

FIG. 4 is a flow chart illustrating a preferred embodiment of the write process as it is carried out before the system is completely initialized. After the system is completely initialized, this procedure may continue to be used, or operation of the system can return to normal write operation such as in the prior art. The write operation described in conjunction with FIG. 4 is the operation in which user data is written to the storage volumes, as opposed to the writing of null data during initialization. The write operation begins step 401 by locking the chunk. If the write request is associated with more than one chunk, then, using the process shown in FIG. 4, the same locking operation is performed by the storage controller 202 for all of the chunks.

As shown by step 402, the next process is to determine whether the chunk has been initialized. If it has, then the process flow moves to step 408 and data is written into the location, and the chunk is released for normal operation thereafter at step 409. The circumstance reflects an operation very similar to a normal write request in a conventional product—except as to the determination of whether the chunk has been initialized.

Should the chunk have been determined at step 402 not to be initialized, the process moves to step 404 where it is determined whether the data for the chunk has been updated. If it does require writing (updating), then a memory is allocated at step 403 for the write request. In this case, the amount of memory needed is approximately the size of the data to be written. If the chunk is neither initialized, nor updated, then the process flow moves to the step 405 in which the bit in the bit map is set for the chunk. At step 406 memory is allocated, and at step 407, the chunk is initialized. Finally, at step 408 data will be written to the chunk by being written to the cache memory in memory 210. At a later time the data from the cache will copied onto the hard disk. Once the data is written in the cache, the chunk is released from the write operation at step 409. This operation is described further below.

Figure 5:
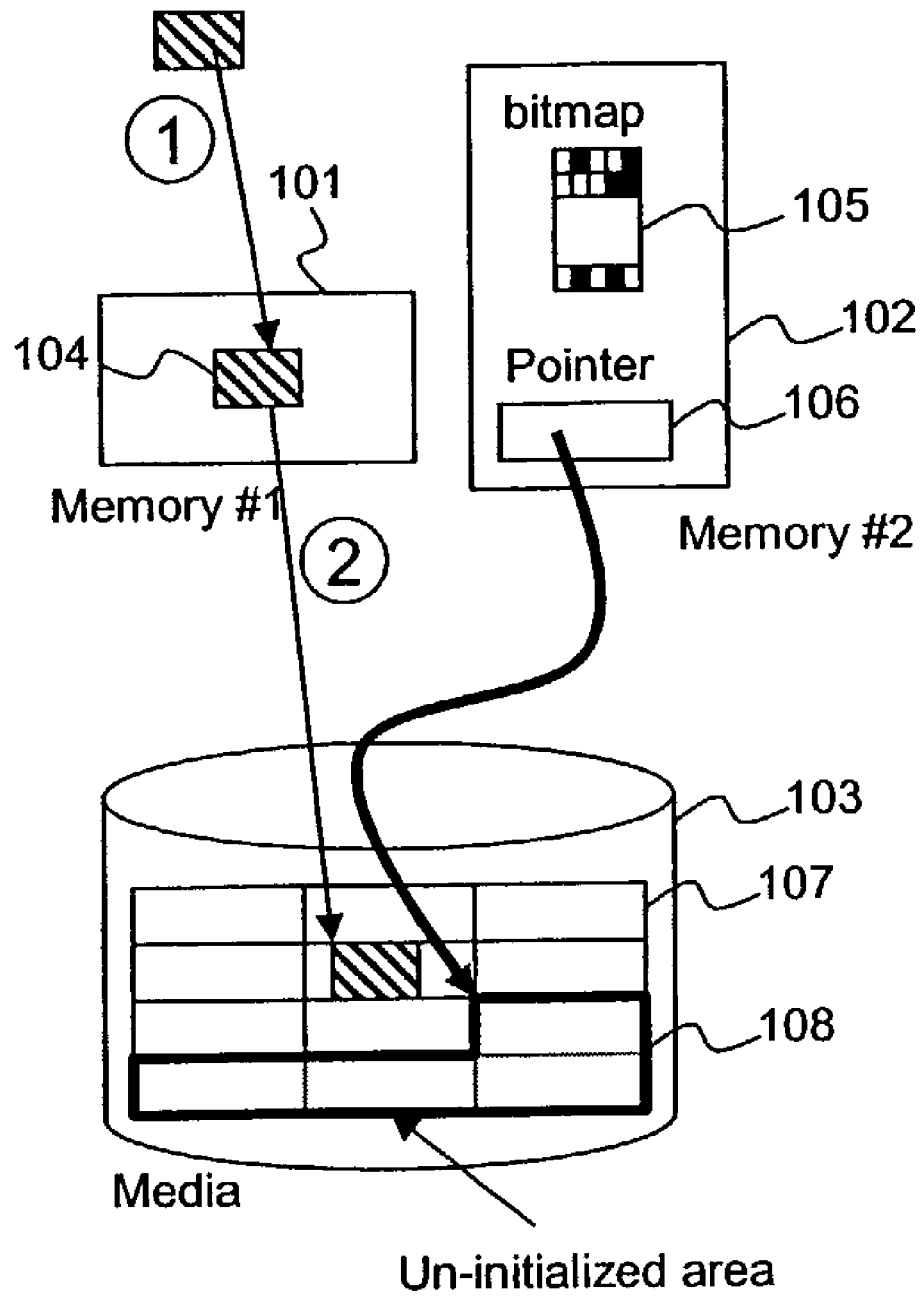
FIG. 5 is a diagram illustrating a first write operation.

FIG. 5 is a diagram illustrating a write operation when the write is directed to an address which is in the initialized area 107 of media 103. Using the process shown in FIG. 4 in steps 401, 402, 403, 408 and 409, a write is first performed to cache memory 104 as shown by the arrow labeled "1" in FIG. 5. At a later time under a control of the storage controller, an operation "2" is performed to write that data from memory 101 into media 103 as illustrated.

Figure 6:
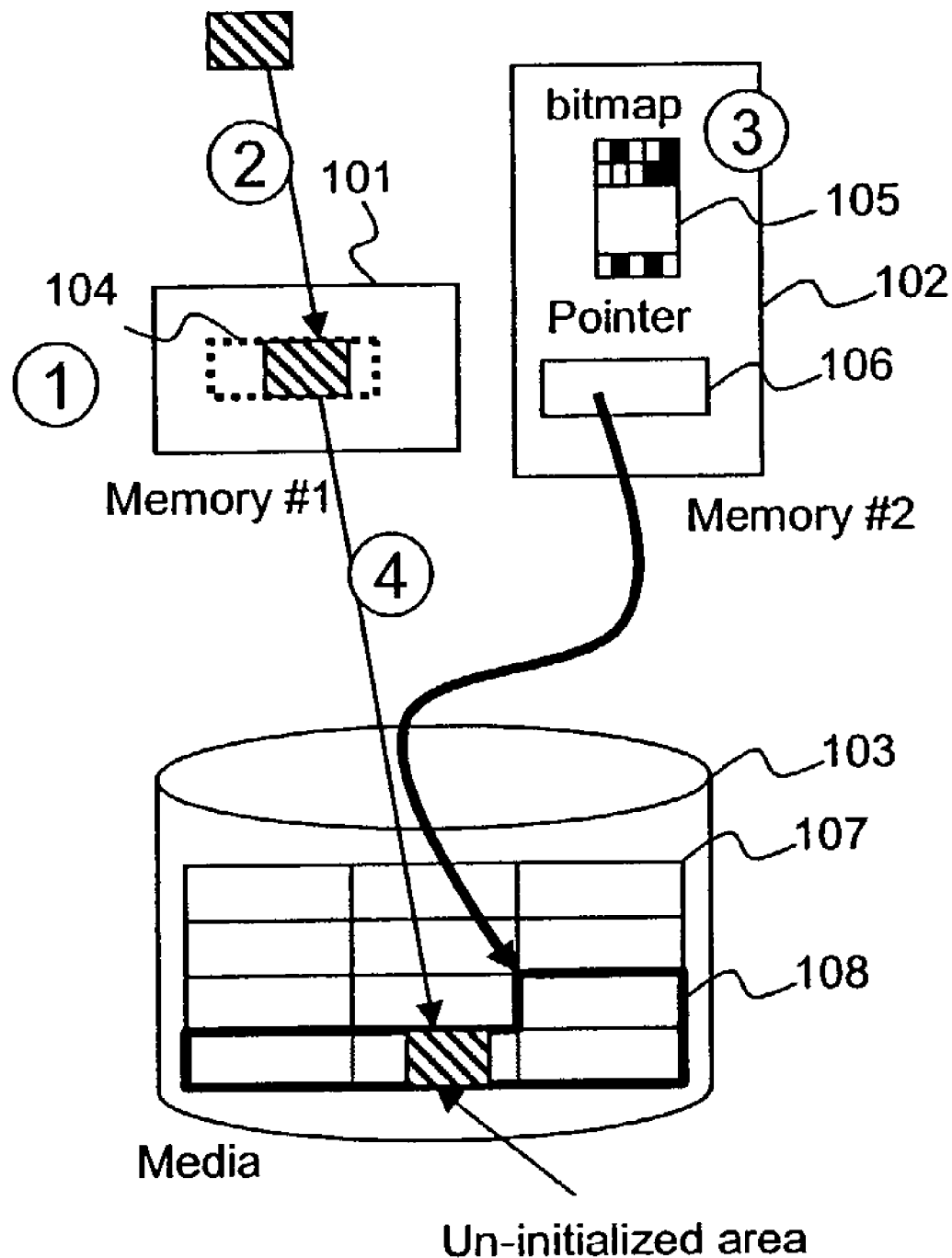
FIG. 6 is a diagram illustrating a second write operation.

FIG. 6 is a diagram illustrating the write process when the address is in an un-initialized area 108 of media 103. As shown by the illustration, the first step is to prepare a chunk sized portion 104 within memory 101 to receive the user data shown by step 2 in FIG. 6. The data is then written into the chunk of the memory and held there. The portions of the memory 104 not holding user data are written at a suitable time with the desired initialization pattern for the media 103. In a parallel operation, or later, a chunk sized portion of block 108 requiring initialization is initialized. This is performed using the process described above in FIG. 4, and the bitmap is made current (step 3). At a convenient later time data is written from memory 101 into media 103 at the targeted location shown by step 4. In essence, in FIG. 6, all of the chunk 104 in memory 101 is suitably written and then all of that chunk is copied into the media 103 to thereby store the initialization data pattern and the user data for the entire chunk. For example, the portions of chunk 104 outside the user data (shown by cross-hatching) will be written with all zeros or whatever pattern is desired.

Figure 7:
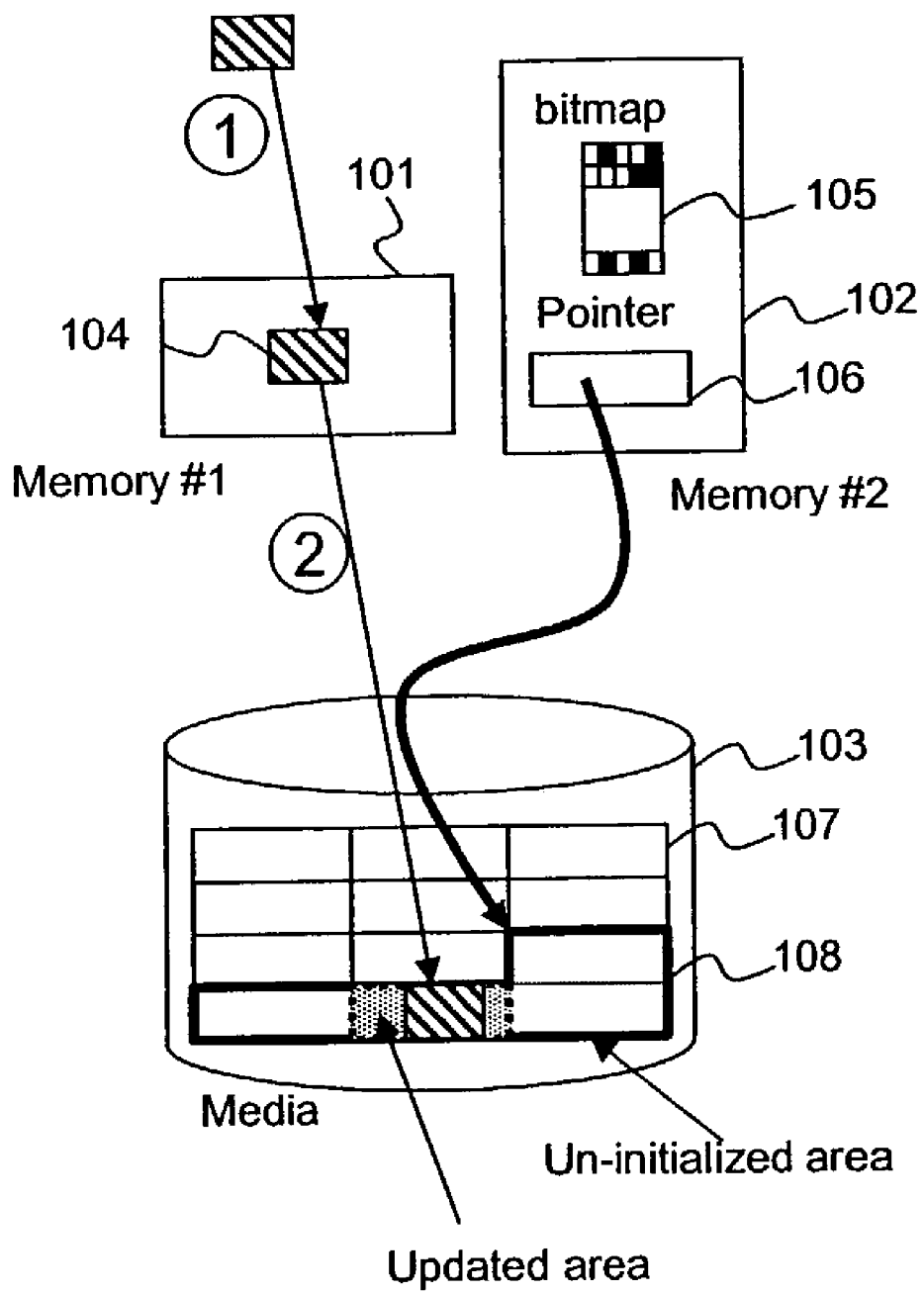
FIG. 7 is a diagram illustrating a third write operation.

FIG. 7 is a diagram which illustrates a detail of the write process when the request is to an un-initialized area, but a chunk which has already been updated from the host 201. This illustration reflects the process of FIG. 4 by steps 401, 402, 404, 403, 408 and 409. The process shown in FIG. 7 is in essence a normal write operation in which the desired data is written into cache memory 104 in a first step, then written into the media 103 in a second step at a later time.

Figure 8:
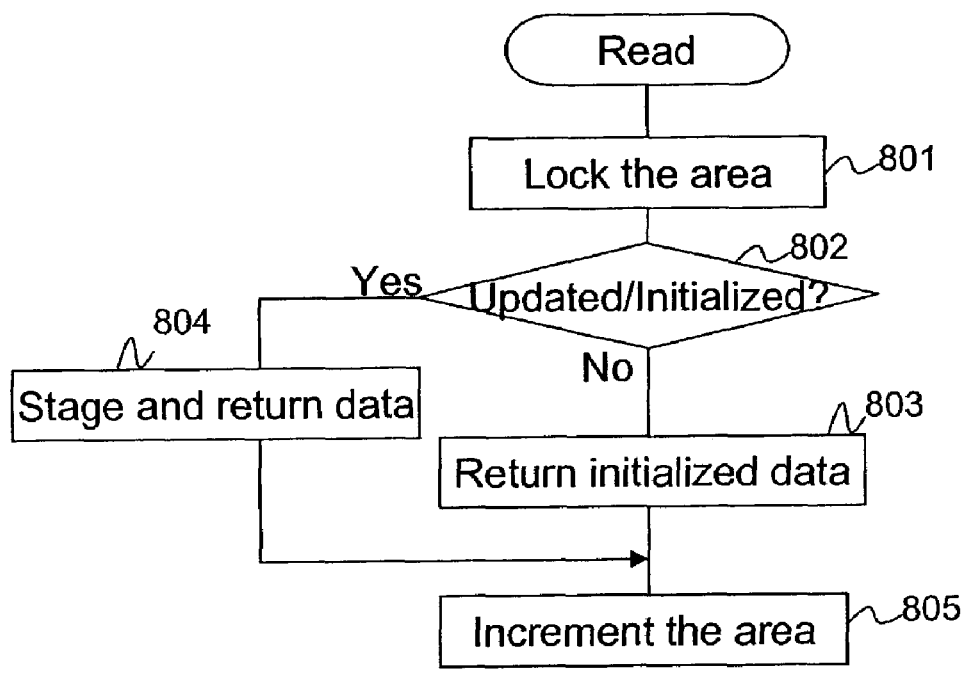
FIG. 8 is a flow chart illustrating a read operation.

FIG. 8 is a flowchart illustrating the read process. At the first step 801 the area from which data is to be read is locked. If more than one chunk is to be read, then all chunks to be read are locked as well. Next at step 802 a determination is made as to whether the addressed area has been updated. If it has already been updated, then the storage controller stages data from the disk drive 203 as shown by step 804. This returns the data to the storage controller and is essentially a normal read operation. On the other hand, if the area from which data is to be read has not be updated, then the storage controller returns initialized data at step 803 without staging it from the disk drive 203. In other words, the initialized data pattern is returned. Finally, as shown by step 805, the locked area is unlocked and the process proceeds on to the next operation.

Figure 9:
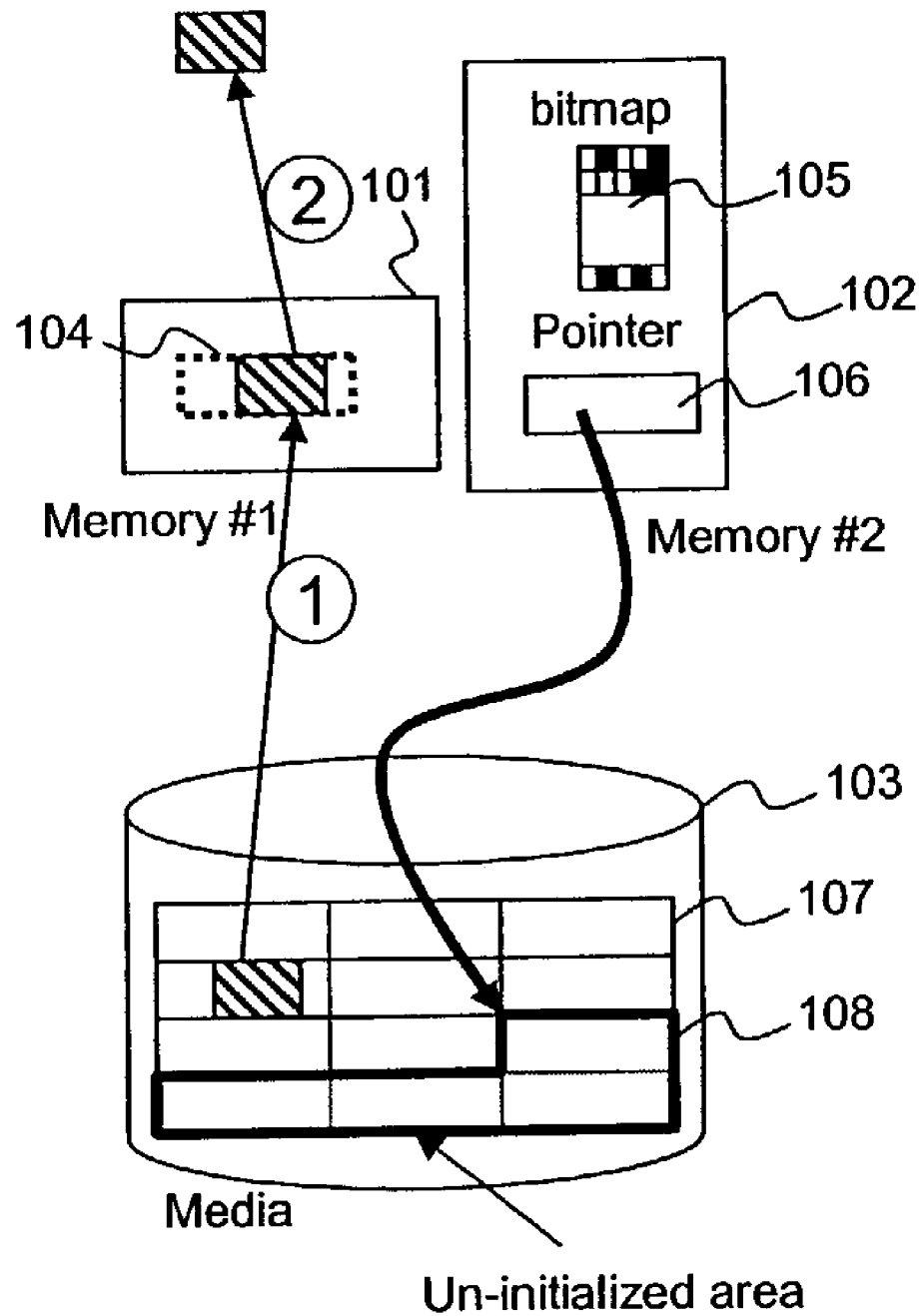
FIG. 9 is a diagram illustrating another read operation.

FIG. 9 is a diagram illustrating details of the read process when a read request is made to a region which has already been updated. These are steps 801, 802, 803 and 805 from FIG. 8. In this situation the read operation is a normal read operation with data being staged from the hard disk drive 103 and provided to the cache memory 104 in a first step. In a later step 2 the data is transferred from the memory 104 to the host.

Figure 10:
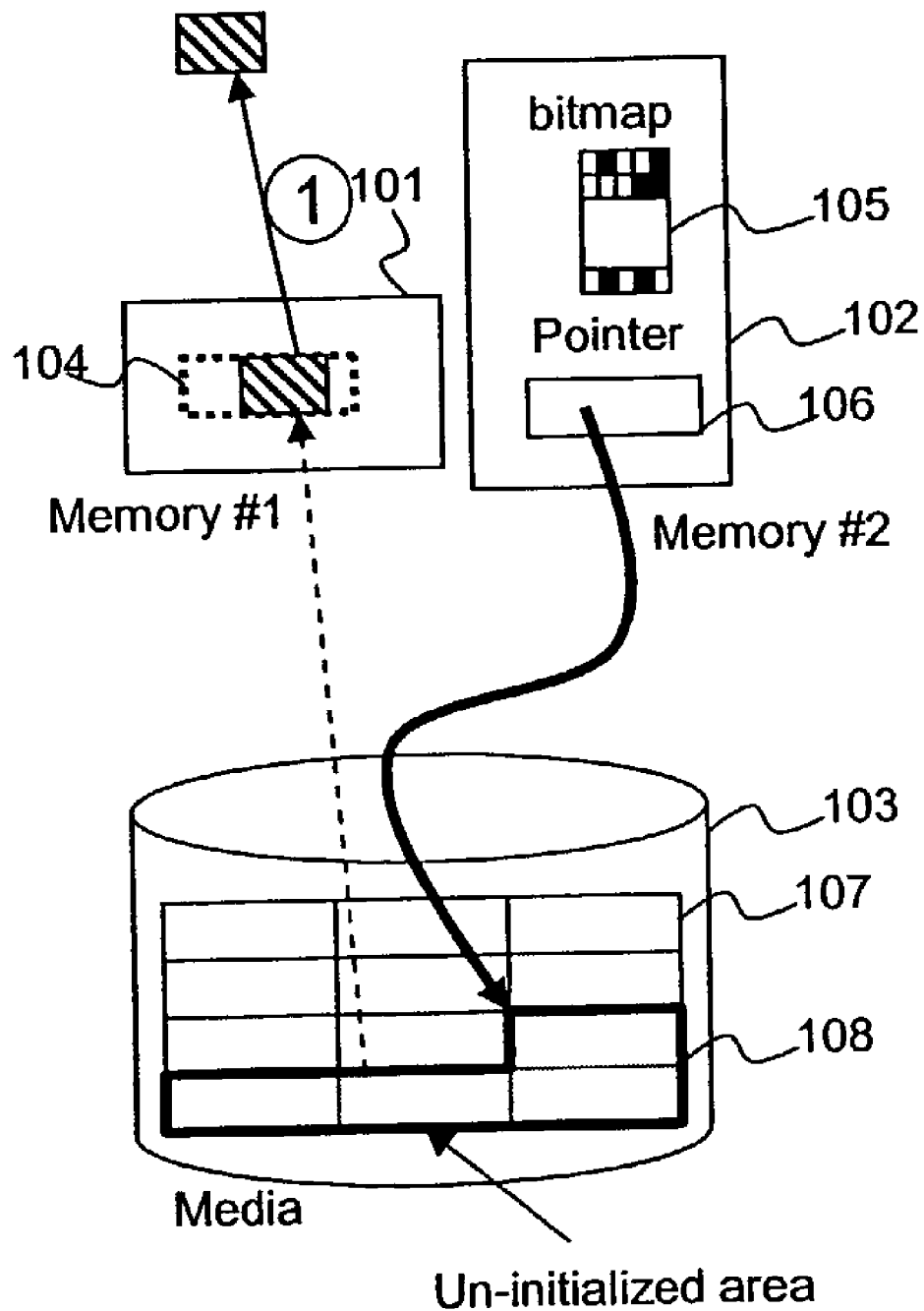
FIG. 10 is a diagram illustrating a further read operation.

FIG. 10 is a diagram illustrating the read process when a request is to an area which has not been initialized. This figure corresponds to processes 801, 802, 804 and 805 in FIG. 8. In this case the read operation is different from a normal read operation and the storage controller obtains from the memory just the initialization data pattern, i.e., the typically all "0" data pattern. Thus, only a single step is required after the data is loaded into the memory.

FIGS. 3 through 10 generally describe background initialization. In other words, in the process described in conjunction with these figures, initialization is performed while the system is operating normally, at least from the perspective of the host. Therefore the read and write operations appear to the host to be performed in the normal manner. In an alternative implementation referred to herein as "initialize on write" the initialization is triggered by receipt of a write request to a given area. Initialization does not occur in the background, instead occurring only when writes are requested to particular chunks. Initialize on write can be implemented with steps 301, 302 and 303 in FIG. 3 and with FIGS. 4 through 10. Steps 304 through 309 in FIG. 3 are unnecessary.

Figure 11:
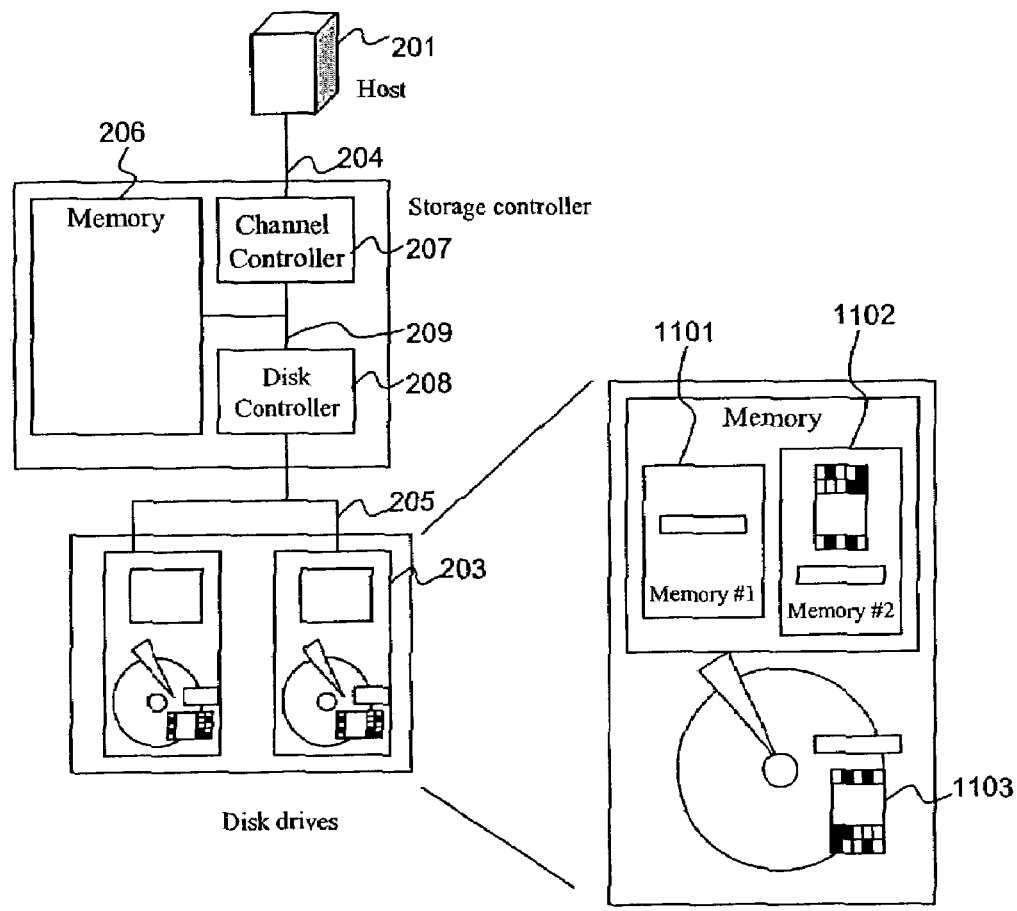
FIG. 11 is a diagram illustrating a system configuration.

In the implementations described above, the storage controller has provided the apparatus for implementing the initialization methods discussed. Continuing advances in processor power, however, have now resulted in some disk drives including internal processors. In these disk drives it is possible to off-load functions like initialization from the storage controller and move them down into the disk drives. This reduces overload on the storage controllers. Such an implementation is shown in FIG. 11. As evident from that figure, the structure of the system is almost identical to that discussed above, except that memories 1101 and 1102 and bit map 1103 now all reside in the disk drive. As before, these memories may be volatile or non-volatile. Because they reside in the disk drive, however, implementation of the memories may consist of using reserved regions of the hard disk drive media itself to store the bit map and control information. In some such implementations it is also possible for the host to connect directly to the disk drive without an intervening storage controller. The architecture of a disk drive suitable for use in this invention is described in several patents. See, e.g., U.S. Pat. Nos. 6,236,528, 5,109,500; and 6,236,528.

In implementations using disk drives with internal processors, the operating procedures are essentially the same as in the storage controller configurations already described. The disk drive 203 operates like a storage system 202 for the initialization procedure. Media 1105 provides the control data. Thus, for example, in procedure 308, the disk drive 203 saves the pointer 106 by updating it onto the media. At procedure 405 the disk drive 203 saves the portion of the bit map 105, which is also updated by being stored on the media 1105.

Figure 12:
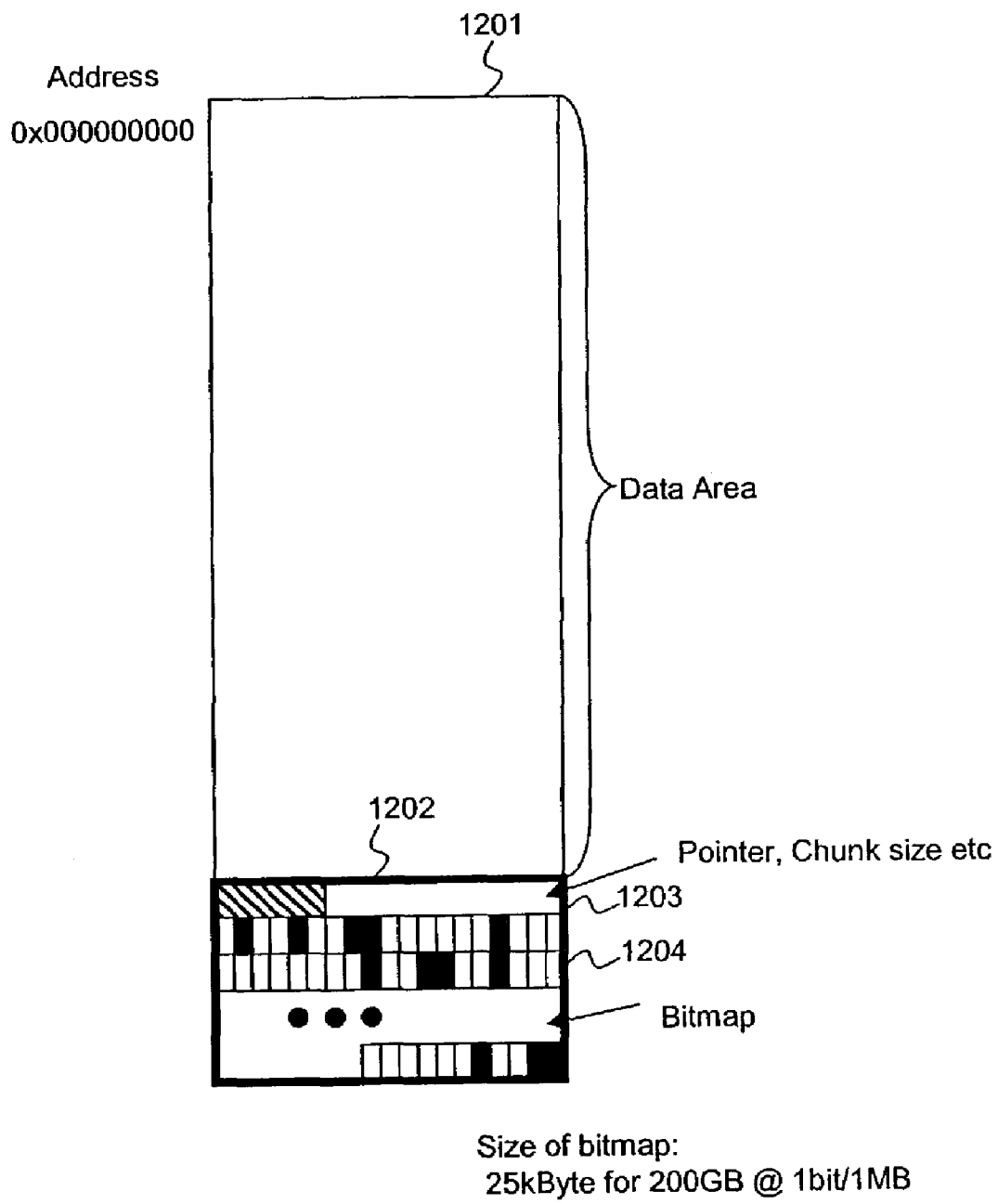
FIG. 12 is a diagram illustrating a bit map.

FIG. 12 illustrates a preferred embodiment of one example for a data layout of the disk drive 203 in an implementation where the media stores the pointer and the bitmap. By storing the control data at the end portion of the disk 203 it will not require address changing, and consumes only a small portion of the media. In FIG. 12 the bit map 1204 is illustrated, as well as the region 1203 where the pointer location, chunk size, and other desired information may be stored. As depicted, this region is at the end of the address range for the disk. For the depicted implementation a 25 k byte bit map is needed for a 200 gigabyte drive where one bit is used for each one megabyte sized chunk.

Figure 13:
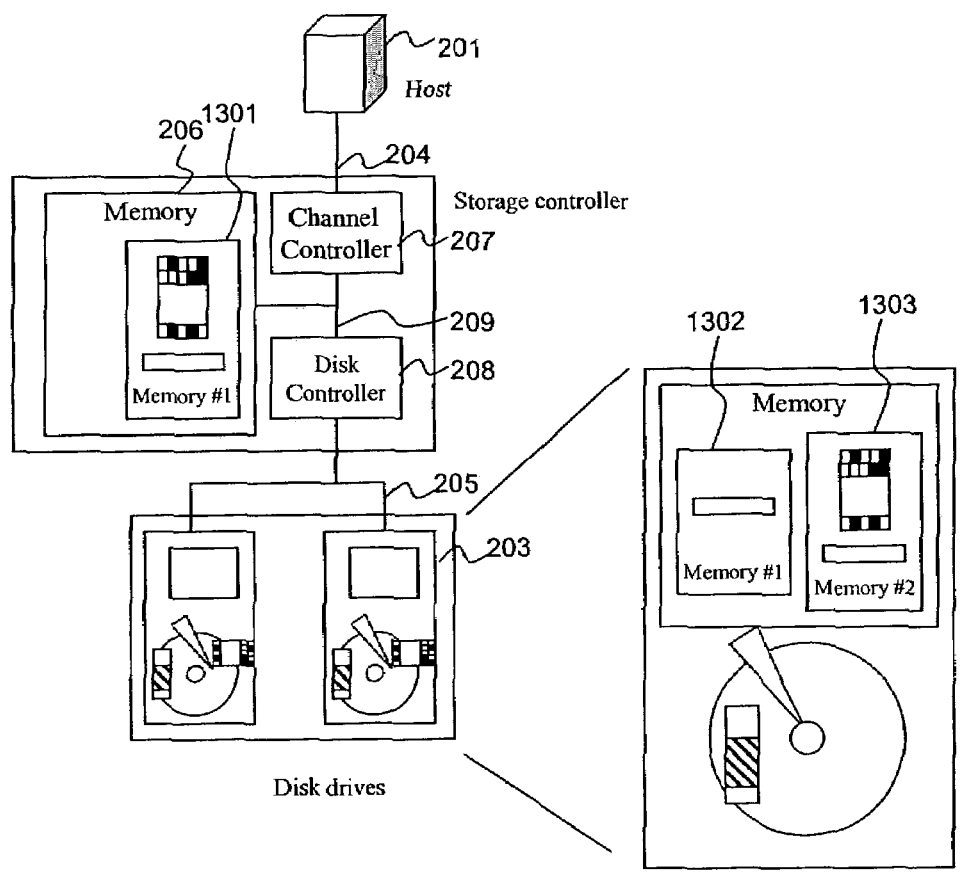
FIG. 13 is a diagram illustrating another configuration.

FIG. 13 is a diagram illustrating a third approach to the structure of the system. As already described, in the first approach a storage controller maintains the bit map and control data, while in the second approach the disk drives themselves maintain that information. The embodiment depicted in FIG. 13 is a hybrid in which two bitmaps are used to reduce the number of write operations to maintain the control data. (In the previous implementation write operations are required to store the control data on the hard disk drive media itself.)

In FIG. 13 the storage controller 202 maintains the control data, generally being advantageous because storage controller 202 is usually more reliable than disk drive 203. Thus the control data can be used despite a failure at the disk drive level. The disk drive 203, however, acts as a disk drive 203 in the second configuration, but just does not save the control data onto the media 1304.

In this implementation the storage controller maintains bit map 105 and handles all of the requests to the volume being initialized. This makes it easy to snoop the request for the purpose of updating the bit map 105, which can thereby be updated every time a write command is made to the volume being initialized. In addition, a pointer 106 allows a resume operation. This eliminates the need for re-initializing the entire disk if there's a failure in the middle of the initialization procedure. Of course, there may be such a difference between the delayed pointer and the storage controller 202 to require initializing the entire disk again. The information regarding the pointer can be made current using vendor unique commands or messages in the status of a request to the disk drive.

Another concern with the embodiment in FIG. 13 is that the disk drive 203 in the storage controller 202 need to have the same set-up data, such as chunk size and disk size. This can be achieved by having a default setting, but then using an inbound protocol such as the SCSI or ATA "mode set/select" command.

Figure 14:
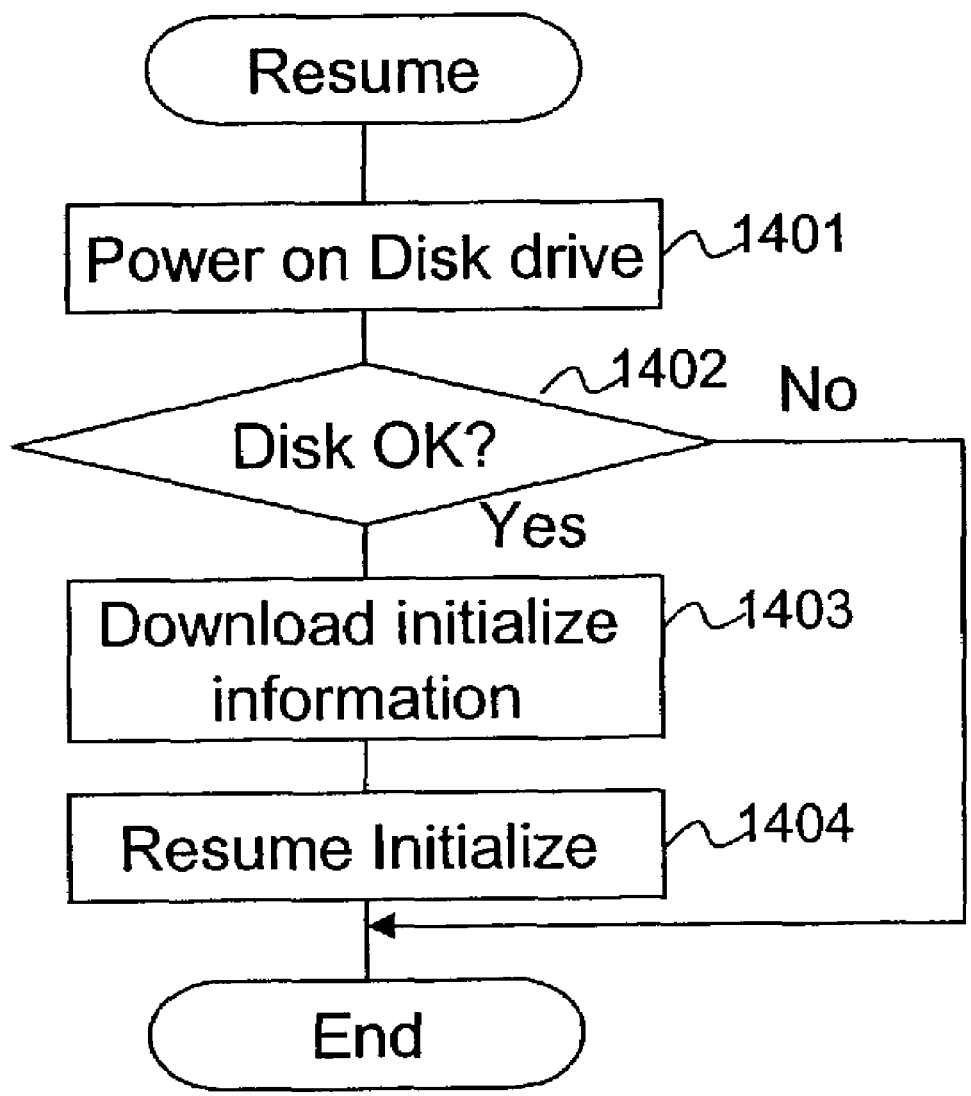
FIG. 14 is a flow chart illustrating a resume operation.

FIG. 14 is a flowchart illustrating a resume operation. If a disk drive 203 fails it may not be usable again. In this case data in the disk drive needs to be reconstructed using redundant data, for example provided by the RAID configuration for use and storage in a new disk drive. This is referred to as a resume operation. In FIG. 14 a first step is to power on the disk drive at step 1401. This will usually be done by the storage controller 202. After it occurs the storage controller checks whether the disk drive 203 is available or not, as shown by step 1402. If the disk drive is available, the control data such as the bit map and pointer are down loaded, and the initialization procedure is resumed at step 1404. On the other hand, if the disk is not available at step 1402, then the disk failure is reported and the procedure ends.

Figure 15:
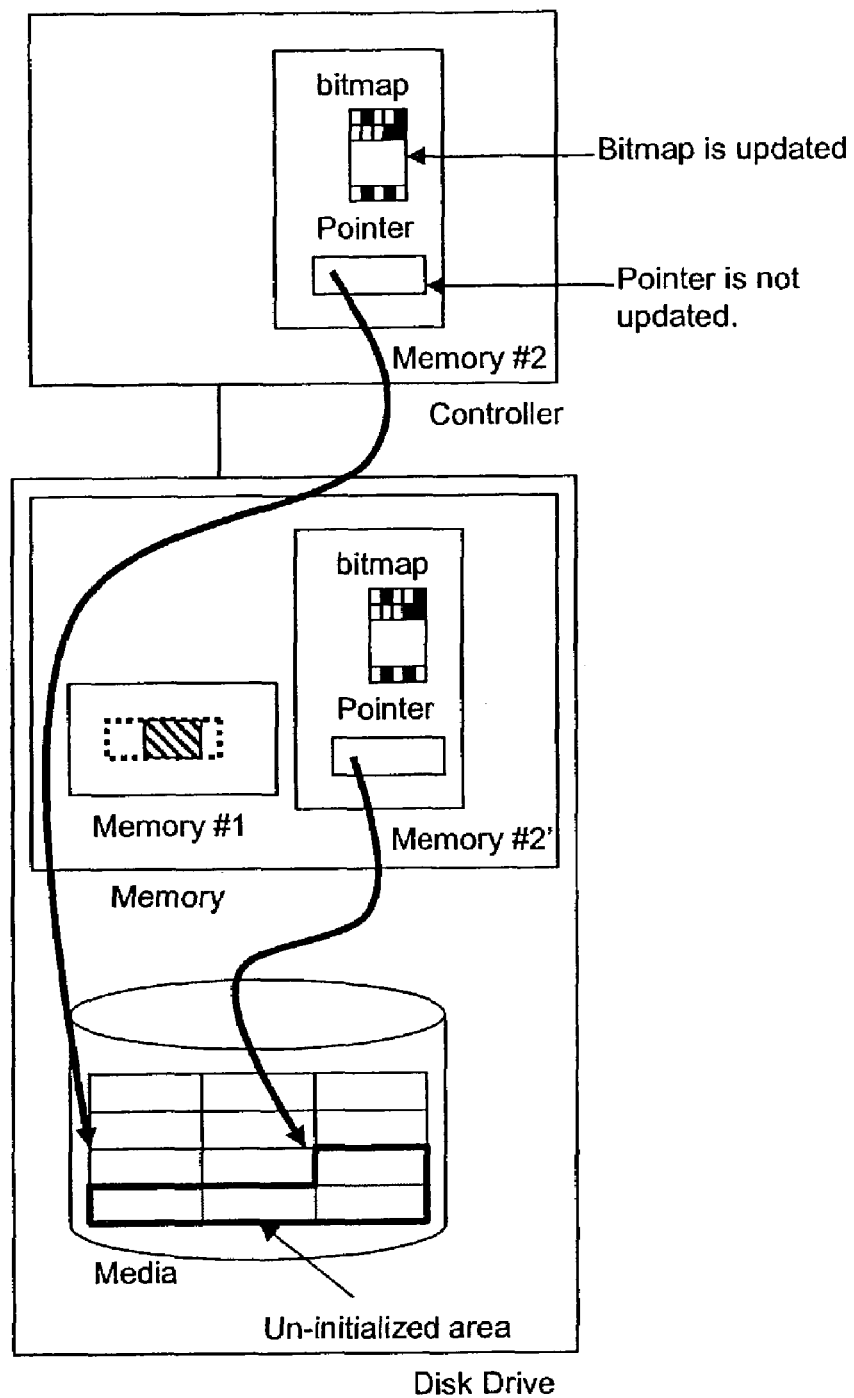
FIG. 15 is a diagram illustrating a first resume operation.

FIG. 15 is a diagram which illustrates the resume operation under normal conditions. In this case the bit map in the storage controller 202 is made current and will be the same as the bit map in the disk drive 203. The pointers, however, will not necessarily agree with the storage controller 202 pointer sometimes being out of date compared to the pointer within the hard disk drive 203.

Figure 16:
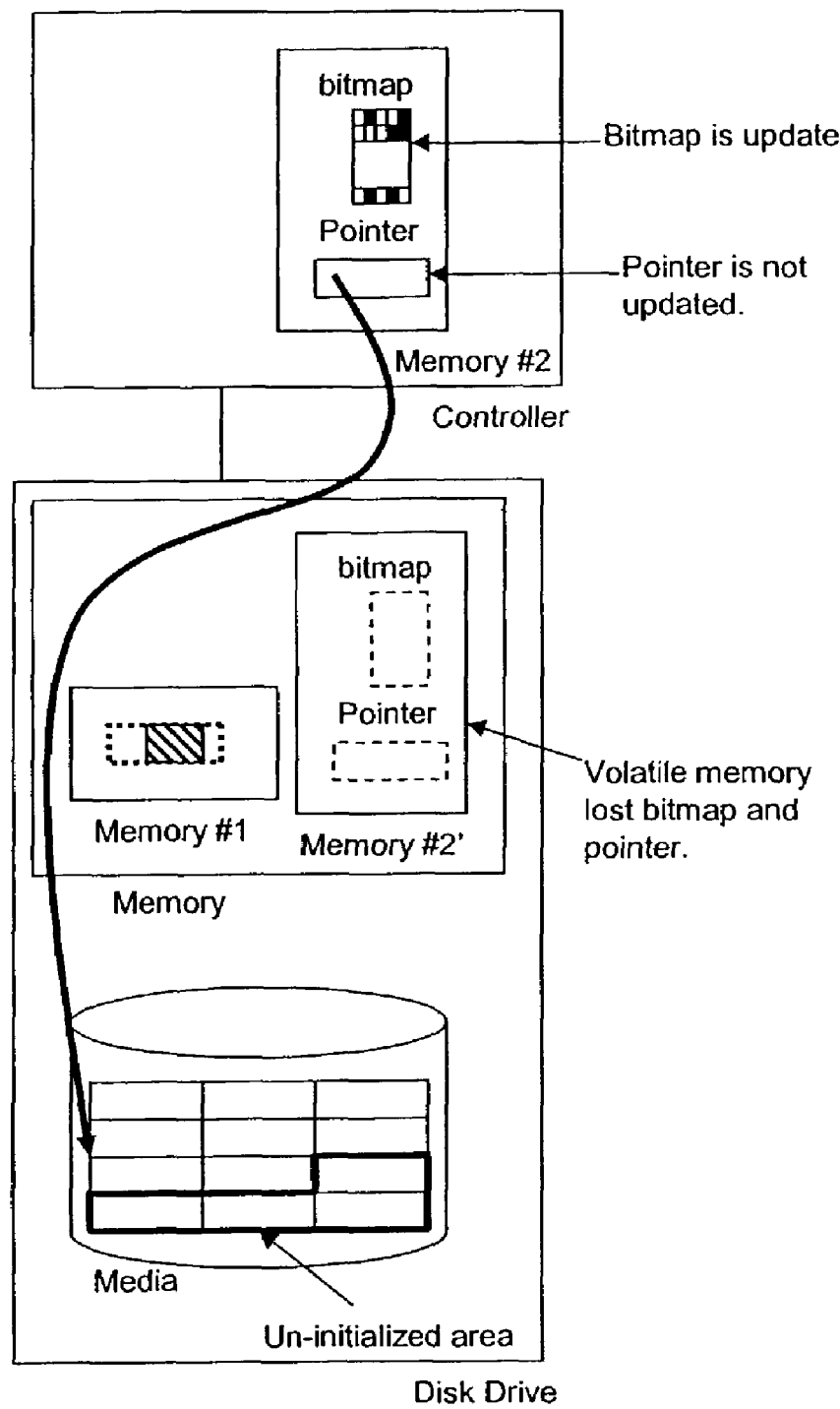
FIG. 16 is a diagram illustrating a second resume operation.

FIG. 16 illustrates the situation after the failure occurs. As shown, the control data in the memory of the disk drive have been lost by the failure. The storage controller 202, however, has maintained the control data in its memory, preferably a non-volatile memory. After the hard disk drive restarts, the storage controller 202 downloads the control data from the storage controller back to the hard disk drive 203.

Figure 17:
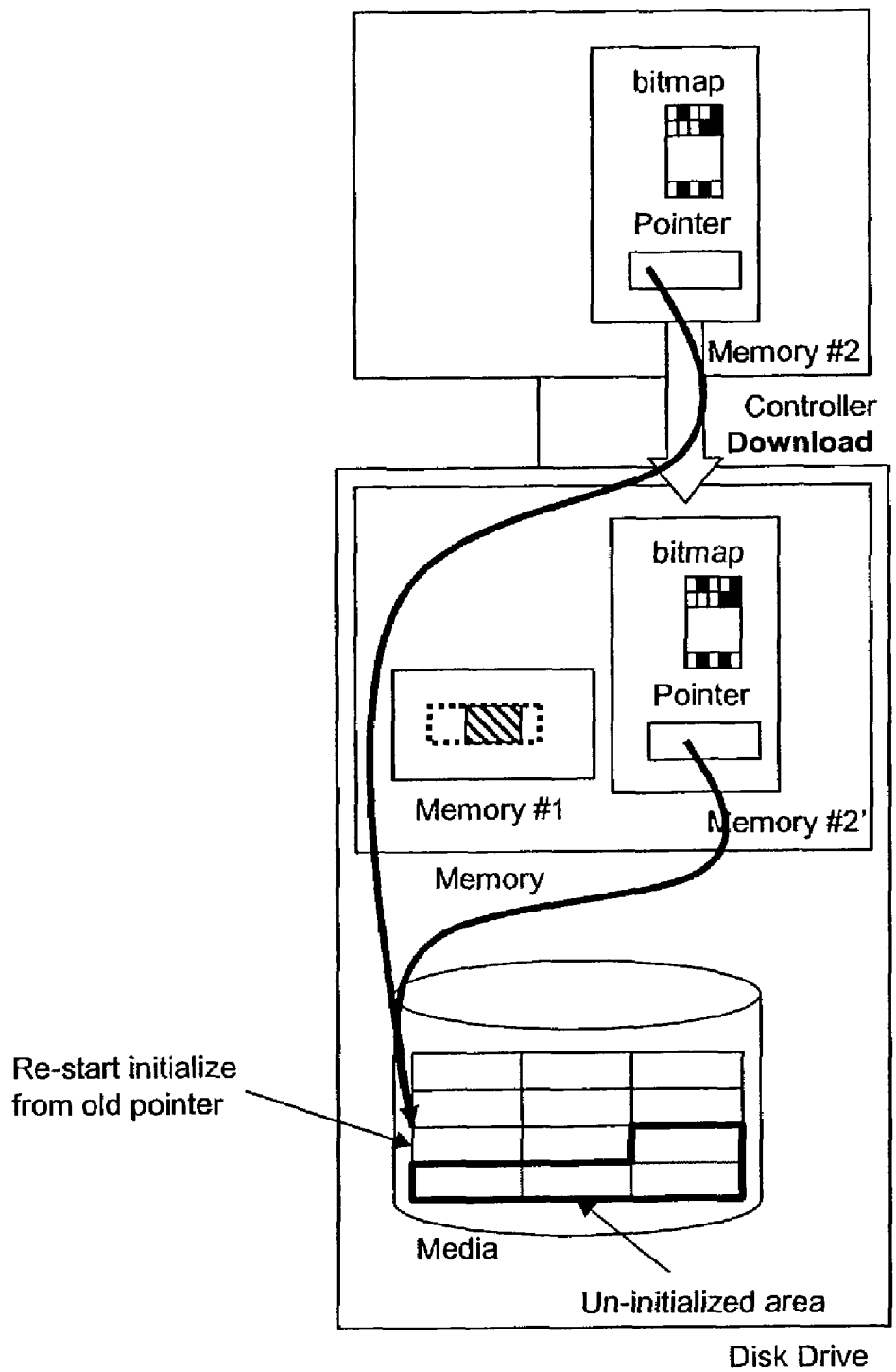
FIG. 17 is a diagram illustrating a third resume operation.

This operation is shown by FIG. 17 which illustrates the situation after the control data has been downloaded into the disk drive 203. The bit map remains the same as before the failure, however, the pointer will be behind the true state of the operation. In the illustration, the pointer is two chunks behind, and it will be necessary for those two chunks to be re-initialized. Meanwhile, the bit map keeps status information and the pointer will have reduced the initialization time, particularly if the disk was almost finished at the time of the failure.

Figure 18:
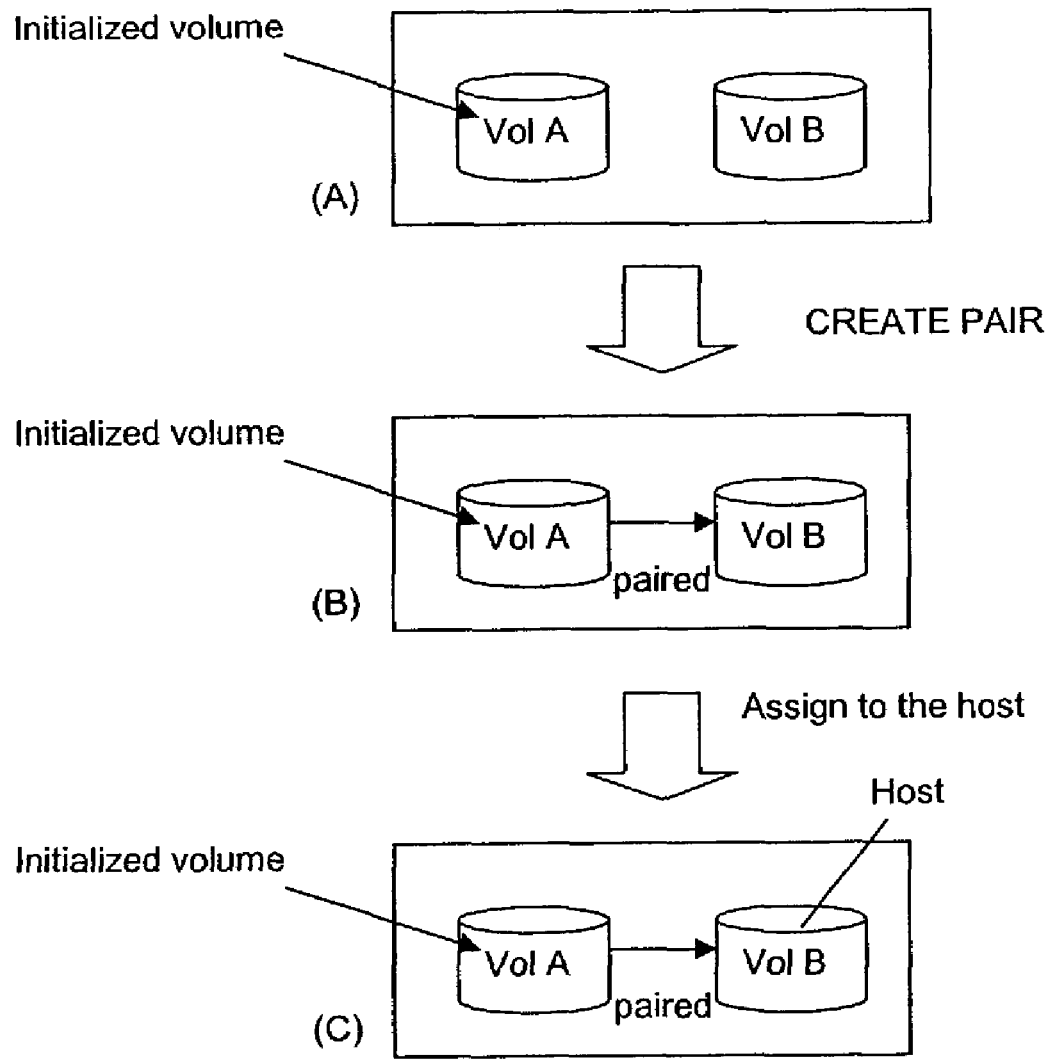
FIG. 18 is a diagram illustrating background initialization.

FIG. 18 illustrates another approach to overcoming the initialization delay discussed herein. If the storage controller has local copy functionality it can copy data in the background. This enables the storage controller to use the "local copy" as a background initialization process. To begin, at least one volume which has been fully initialized is required. A local pair is created using the initialized volume A and non-initialized volume B. After volume B is accessible from the host, a copy operation from volume A to volume B can be done as a background operation. At the conclusion of that operation volume B will have been initialized to match volume A.

The table below summarizes the various configurations and operations. The columns represent the three configurations discussed above, one in which the storage controller handles the initialization procedure, one in which the disk drive provides that function, and the hybrid approach. The rows of the table designate the locations for the various memories, the media, and the control of the initialization operation.

|  | Configuration 1 Storage Controller | Configuration 2 Disk Drive | Configuration 3 Hybrid |
|---|---|---|---|
| Cache Memory Location | Controller | Disk Drive | Disk Drive |
| Bitmap/Pointer Memory Location | Controller | Media of the Disk Drive | Controller and Memory at the Disk Drive |
| Media Initialize Operation | Disk Drive At Controller | Media At Disk Drive | Media At Disk Drive |

Each of the embodiments of this invention provides unique advantages in comparison to prior art apparatus and systems for initialization of storage systems. Although preferred embodiments of the invention have been described above, the scope of the invention is defined by the following claims.

What is claimed is:

1. A method of preparing storage media in a storage system for data to be written to the storage media, wherein the system is prepared for writing data to the storage media in both of the following two ways:

initialization of portions of the storage media are performed as a background job in which input/output requests and initialization are executed as background jobs; and otherwise any un-initialized portions of the storage media to which write requests are directed are initialized prior to writing data in response to write requests that are received by the system for writing the data to the storage media portions.

2. A method as in claim 1 wherein the initialization is performed upon receipt of a command from a controller controlling the storage system.

3. A method as in claim 1, further including:

performing a resume operation for reconstructing data.

4. A method as in claim 1 wherein portions of the storage media are not initialized when the system is first used.

5. A method as in claim 1 wherein the system includes a storage controller and disk drives, and wherein initialization is controlled by at least one of the storage controller and the disk drives.

6. A method as in claim 5 wherein the storage controller maintains control data for controlling the initialization by storing it in a non-volatile memory.

7. A method as in claim 6 wherein the storage controller controls the initialization, and the disk drives initialize themselves upon receiving a command from the storage controller.

* * * * *